United States Patent [19]

Kaneko

[11] Patent Number: 4,639,920

[45] Date of Patent: Jan. 27, 1987

[54] DATA INTERPOLATING CIRCUIT USING A TWO DATA WORD MEMORY

[75] Inventor: Takashi Kaneko, Tokyo, Japan

[73] Assignee: NEC Corporation, Tokyo, Japan

[21] Appl. No.: 584,262

[22] Filed: Feb. 27, 1984

[30] Foreign Application Priority Data

Feb. 25, 1983 [JP] Japan .................. 58-31481

[51] Int. Cl.$^4$ ............................ G06F 11/10
[52] U.S. Cl. ...................... 371/31; 364/723
[58] Field of Search .............. 371/31; 364/723; 358/314; 360/38.1

[56] References Cited

U.S. PATENT DOCUMENTS

| | | | |
|---|---|---|---|
| 4,430,736 | 2/1984 | Scholz | 371/31 |
| 4,451,921 | 5/1984 | Odaka | 371/31 |
| 4,497,055 | 1/1985 | Hoshino et al. | 371/31 |

*Primary Examiner*—David H. Malzahn
*Attorney, Agent, or Firm*—Sughrue, Mion, Zinn, Macpeak and Seas

[57] ABSTRACT

An interpolation circuit and method corrects a data word having an error by either substituting the most recent prior correct data word or substituting the mean value of the most recent prior correct data word and the data word subsequent to the one having the error. The method is carried out using a novel architecture having memory access control. A RAM stores the most recent prior correct word, $A_j$, which will be the current word $A_n$ if $A_n$ has no error. If the subsequent workd $A_{n+1}$ is without error it is stored. The two memory locations are, in effect, reversible, to enable the subsequent work $A_{n+1}$ to become the most recent correct prior word, $A_j$, for subsequent processing, where appropriate, using a minimum of hardware.

The most recent prior word $A_j$ (which may be $A_n$) is read to an adder which performs addition and division by two. Depending upon the error content of $A_n$ and $A_{n+1}$, $A_j$ is either added to itself or to $A_{n+1}$ to obtain the final interpolated data. All words are divided into upper-half and lower-half portions to cut down on the hardware required.

17 Claims, 5 Drawing Figures

DATA INTERPOLATING CIRCUIT USING A TWO DATA WORD MEMORY

DETAILED DESCRIPTION OF THE INVENTION

(TECHNICAL FIELD OF THE INVENTION)

The present invention relates to a data interpolating circuit for interpolating any uncorrectable data in a sequence of digital data, such as a digital audio data string.

(DESCRIPTION OF THE PRIOR ART)

In general, digital data read out from a recording medium, such as a tape, disc, semiconductor memory device or the like, may have error bits caused by dropout errors, start-stop errors, and data-read errors. The data-read errors occur due to the limitations of operational performance of a device for reading data from the medium or due to the existence of any defect in the medium itself. In order to detect the error bits, a check code such as a parity code, a cross word code, or a Hamming code, is added to each word of the digital data and is preliminarily stored in the recording medium together with the digital data. The check code has at least one check bit per one word. The digital data and the check code read out of the medium are checked in every word. As the result of this check operation, if an error is detected in a word data, an error correcting circuit is activated. However, when the word data includes a plurality of error bits, it is hard to correct all of the error bits. In practical use, at most two or three bits are a limit that are capable of error correction. Further, high performance error correction requires a large number of check bits, so that the recording capacity of digital data is limited. Hence, there are many cases where error correction cannot be perfectly effected. It is, however, required to prevent any error data from being delivered, since in the case of, for example, a digital audio system any erroneous digital data results in an offensive noise to the ear when demodulated into an analog signal. Also in a sound processor, an image processor, etc., the uncorrected error bits exert a harmful influence upon the sound or image to be produced. In consequence, there is need for a data interpolating circuit which effects interpolation processing for replacing the data which cannot be corrected with replacement data near the correct data.

It is now assumed that when checked data in which one word is constituted by M bits are obtained in order, i.e., $A_1, A_2, A_3, \ldots, A_{n-1}, A_n, A_{n+1} \ldots$, every clock timing per word (W. CLOCK), from a signal encoder which feeds input data into the data interpolating circuit, an error flag bit $F_n$ is added to each word $A_n$. The error flag bit designates whether the input data is corrected data or a data which is uncorrectable due to the limitations of the error-correcting capacity. It is also assumed that when $F_n$ is "0", data word $A_n$ is correct data, but when $F_n$ is "1", data word $A_n$ includes an error. A general data interpolation is effected according to Table 1 by employing data previous to data $A_n$ and data $A_{n+1}$ subsequent to the data $A_n$, to obtain output data $B_{n+1}$ in synchronism with the subsequent W. CLOCK.

TABLE 1

| State | 1 | 2 | 3 |
|---|---|---|---|
| $F_{n-1}$ | X | X | X |
| $F_n$ | 0 | 1 | 1 |
| $F_{n+1}$ | X | 0 | 1 |
| $B_{n+1}$ | $A_n$ | $\dfrac{A_j + A_{n+1}}{2}$ | $A_j$ |
| Interpolation processing | Present data output | Mean value interpolation | Pre-hold |

In the interpolation processing according to Table 1, state 1 is the state where $F_n$ is "0". In this state, the present data $A_n$ is correct and is delivered as the output data $B_{n+1}$ in synchronism with the subsequent W. CLOCK independently of the contents of any error flag bits previous and subsequent thereto. The state 2 is the state where $F_n$ is "1". This state shows that the present data $A_n$, is incorrect, and the subsequent data $A_{n+1}$ is correct. In such the case, a correct data word $A_j$, which is temporally closest to the present data $A_n$, is used to interpolate an output data word $B_{n+1}$. Then, a mean value of the data $A_j$ and the data $A_{n+1}$, that is $(A_j+A_{n+1})/2$, is delivered as the output data $B_{n+1}$. Moreover, the state 3 is the state where $F_n$ is "1" and $F_{n+1}$ is "1". In this state, error data have been consecutively generated. In such a case, the data $A_j$ is delivered as the output data $B_{n+1}$, but any error data is not delivered and interpolated by other data.

A data interpolating circuit of the prior art has a complex hardware circuit to execute the processing shown in Table 1. That is, the circuit needs at least three independent latch circuits for temporarily storing present data $A_n$, correct data $A_j$ which is temporally closest to the present data $A_n$, and next data $A_{n+1}$ subsequent to the present data $A_n$, respectively. Moreover, an arithmetic circuit, for example an adder, is needed to produce a mean value and a multiplexer circuit is needed to select an output of the arithmetic circuit or outputs of the latch circuits. Particularly, a shift operation to sequentially set the three items of data mentioned above into the respective latch circuit is required, since three items of data are sequentially received at the interpolating circuit. Further, since the prior art interpolating circuit uses a sequential processing architecture, all bits of data to be interpolated must be processed at the same time. Therefore, a large number of bit lines to transfer all bits to the latch circuits, to the arithmetic circuits, and to the multiplexer circuit are required. Thus, the semiconductor chip size can not be small.

An object of the present invention is to provide a data interpolating circuit with a small size in which a number of circuit elements and bit lines can be reduced.

Another object of the present invention is to provide a data interpolating circuit wherein a nobel processing architecture using a memory control is introduced.

Still another object of the present invention is to provide a data interpolating circuit adaptable to a semiconductor integrated circuit design and to multi channel design.

SUMMARY OF THE PRESENT INVENTION

The data interpolating circuit of the present invention comprises an RAM having a memory capacity for storing data for two words per channel, an adder which takes the output of the RAM as one of its inputs, a first latch which takes the output of the adder as its input and delivers data to be fed back to the other input of the adder, a second latch which takes the output of the first latch, a third latch which takes the outputs of the first and second latches and delivers interpolated output data; a fourth latch which takes an error flag data added to data to be stored in the RAM, a fifth latch which takes the output of the fourth latch, and a timing control circuit which designates the RAM address according to the outputs of the fourth and fifth latches and supplies a write control signal and a read control signal to the RAM and a latch timing signal to each latch.

According to the present invention, input data is firstly stored in the RAM (random access memory), not in latch circuits, and thereafter transferred to the adder. At this time, since data to be read out of the RAM can be designated at random according to the contents of the error flag bits, the shift operation required in the prior art is unnecessary. The second latch stores temporarily a lower portion of the data of an interpolated word. The output of the second latch is applied to the third latch as an output stage together with an upper portion of the data of the interpolated word stored in the first latch. That is, a word data to be interpolated is divided into two data portions (a lower and an upper), and these two data portions are sequentially processed in this order. Therefore, an interpolation can be executed through a small number of bit lines.

Further, since the only data required for interpolation is selected by a memory access, the multiplexer of the prior art to inhibit unrequired data is not necessary in the present invention. Therefore, the circuit structure of the output stage is very simple and does not require many circuit elements.

As described above, the data interpolating circuit, wheren a nobel architecture having a combination of a RAM with an adder, is a very simple circuit and is easily adapted to a semiconductor integrated circuit. Particularly, the number of circuit elements and bit lines can be extremely reduced.

DETAILED DESCRIPTION OF THE PRESENT INVENTION (DESCRIPTION OF THE PRIOR ART)

Figure 1:
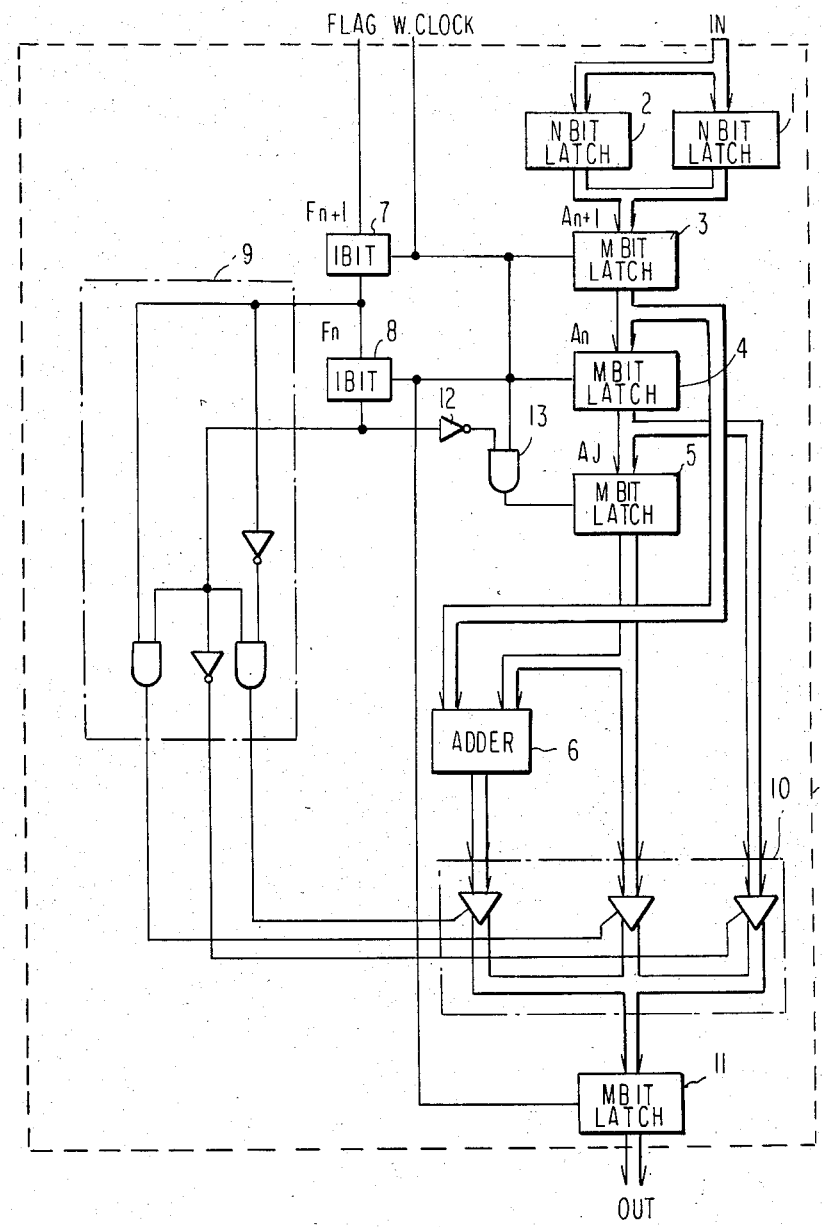
FIG. 1 is a block diagram of a prior art data interpolating circuit.

FIG. 1 is a block diagram of a prior art data interpolating circuit which executes interpolation processing of Table 1 and is constituted by an IC. In FIG. 1, a prior art circuit 14 is integrated on a semiconductor chip and comprises a first N-bit latch 1 for latching the high-order N-bit part (an upper portion) of an input data word $A_n$ applied through an input terminal IN from a data encoder, a second N-bit latch 2 for latching the low-order N-bit part (a lower portion) of the input data word $A_n$, a first one-bit latch 7 for latching an error flag bit $F_n$, first and second M-bit latches 3 and 4 for successively latching and shifting the outputs of the first and second N-bit latches 1 and 2 in synchronism with W. CLOCK, a third M-bit latch 5 for latching the output of the second M-bit latch 4 according to the states of first and second gates 12 and 13 in synchronism with W. CLOCK, a second one-bit latch 8 for successively latching and shifting the output of the first one-bit latch 7 in synchronism with W. CLOCK, an adder 6 connected to the first and third latches 3 and 5 for taking the outputs of the two M-bit latches 3 and 5, respectively. The adder 6 calculates a mean value of these outputs. Further, a multiplexer 10 is adapted to select any one of the outputs of the adder 6, the second M-bit latch 4 and the third M-bit latch 5. A decoder 9 is adapted to control the multiplexer 10 by means of the outputs of the first and second one-bit latches 7 and 8. An M-bit latch 11 is used as an output latch and is connected to the multiplexer 10 to latch the output of the selected data in synchronism with W. CLOCK. Interpolated data is provided at an output terminal OUT. In this case, $M=2N$, and the data from the data encoder positioned at the previous stage of this prior art circuit 14 is divided into the high-order N bits and low-order N bit which are sequentially transferred to the input terminal IN.

The operation of the prior art circuit will now be explained. M-bit data words $A_1, A_2, \ldots A_{n-1}, A_n, A_{n+1} \ldots$ and error flag bits $F_1, F_2, \ldots F_{n-1}, F_n, F_{n+1} \ldots$ are successively latched and shifted by the M-bit latches 3, 4, 5 and the one-bit latches 7, 8 in synchronism with W. CLOCK. The M-bit latch 5 latches the output of the M-bit latch 4 only when the output of the one-bit latch 8 is "0" by the operations of the gates 12, 13. More specifically, at a certain point of time n, data $A_{n+1}, A_n, A_j$ are stored in the M-bit latches 3, 4, 5, respectively, and the error flag bit $F_{n+1}$ of the data $A_{n+1}$ and the error flag bit $F_n$ of the data $A_n$ are stored in the one-bit latches 7, 8, respectively. According to the states of $F_{n+1}$ and $F_n$, the decoder 9 controls the multiplexer 10. This multiplexer 10 selects the output of the second M-bit latch 4 in the case of the state 1 in Table 1. On the other hand, in the case of the state 2, the output of the adder 6 is selected, while in the case of the state 3, the output of the third M-bit latch 5 is selected. It is thereby possible to obtain an interpolated output data $B_{n+1}$ at the output terminal OUT in synchronism with W. CLOCK for each of the states shown in Table 1. Thus, the prior art circuit performs the desired operations shown in Table 1.

In the prior art, however, three data words or items of data $A_j$, $A_n$ and $A_{n+1}$ must be separately stored in the respective latches 3, 4 and 5. Further, the output of the adder 6, the output of the second latch 4, and the output of the third latch 5 must be always prepared in every word and be applied to the multiplexer 10. Therefore, many circuit elements and bit lines for transferring the three data words independently are necessary. This is because the prior art interpolation process uses a sequential architecture having a shift operation of the latches at an input stage.

Moreover, in practical use, M (the number of bits of a word to be interpolated) is generally larger than 10. Therefore, it is necessary to provide an exceedingly large number of wirings (bit lines) for M bits between the latches and a large number of elements in the multiplexer, decoder and many latches. In consequence, it is extremely inconvenient and difficult to reduce the chip size of the prior art circuit.

(DESCRIPTION OF THE PREFERRED EMBODIMENT)

An embodiment of the invention will be described below with reference to the accompanying drawings.

Figure 2:
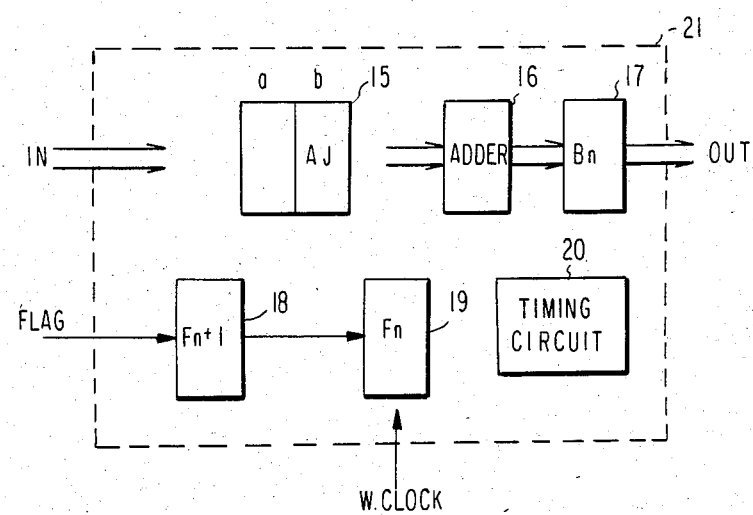
FIG. 2 is a schematic block diagram of a data interpolating circuit in accordance with an embodiment of the invention.
Figure 3:
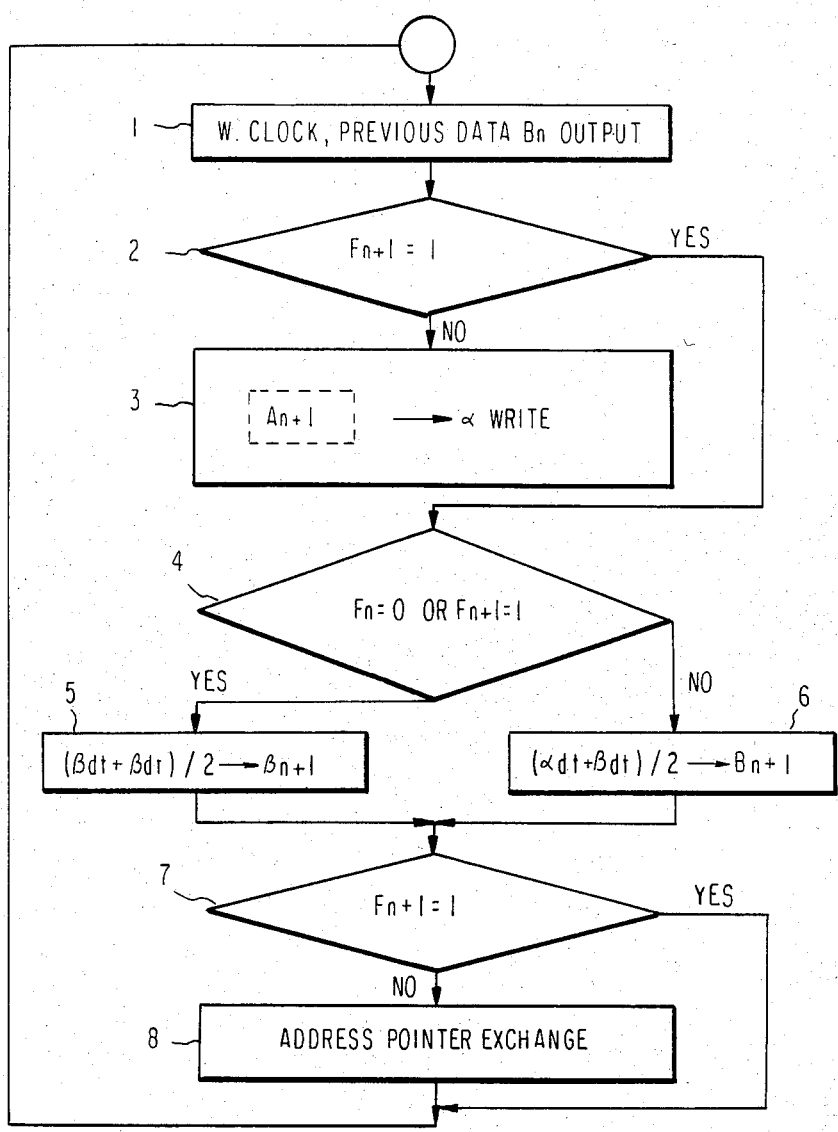
FIG. 3 is a flowchart showing an algorithm for the operation of the circuit in accordance with the embodiment of the invention.

FIG. 2 is a schematic block diagram of a circuit in accordance with an embodiment of the invention, and FIG. 3 shows an algorithm for the circuit in accordance with the embodiment.

Referring first to FIG. 2, the data interpolating circuit in accordance with the embodiment comprises a RAM 15 which stores at least two words, each of which is constituted by M bits, an adder 16, an M-bit latch 17, one-bit latches 18 and 19, and a timing circuit 20. Each of these circuits is controlled in their timings by the timing circuit 20. Data input timing and data output timing is in synchronism with W. CLOCK.

It is now assumed that each of the circuits is in the first state at a point of time n. It is also assumed that in this case an address pointer for two words is set in the timing circuit 20 with respect to the RAM 15, and one of the addresses designated by this pointer is defined as $\alpha$, while the other is defined as $\beta$, and a correct data word $A_j$, which is closest to the present point of time, is stored at the relative address $\beta$.

The basic operation of the circuit in accordance with the embodiment shown in FIG. 2 is as follows: According to the states of the error flag bits $F_n$ and $F_{n+1}$, the data $\beta_{dt}$ stored at the relative address $\beta$ in the RAM 15 or the data $\alpha_{dt}$ stored at the relative address $\alpha$ is read out and fed into the adder 16 to perform an addition. Then, output data is delivered from the M-bit latch 17 to the output terminal OUT in synchronism with W. CLOCK at the subsequent point of time (n+1). At this time, the error flag bits $F_n$ and $F_{n+1}$ are stored in the one-bit latches 19 and 18, respectively. The circuit in accordance with the embodiment operates according to an algorithm shown in FIG. 3. The algorithm shown in FIG. 3 makes transition according to a timing sequence obtained by subdividing W. CLOCK, as follows: step ①, step ②, step ③ . . . These timing signals are generated by the timing circuit 20.

The operation in each of the states shown in Table 1 will be explained hereinunder with reference to FIG. 3.

The state 1 shown in Table 1 is the state where $F_n=0$ and $F_{n+1}=X$ (X means a don't care value), and is divided into a state $1_1$ where $X=0$ and a state $1_2$ where $X=1$.

First of all, in the state $1_1$, $F_n=0$ and $F_{n+1}=0$, i.e., this is a case where two correct data words are consecutively obtained. In this case, in the step ①, the data applied to the input of the M-bit latch 17 at the previous point of time (n−1) is delivered as an output data $B_n$ from the M-bit latch 17 in synchronism with W. CLOCK. Then, in the step ②, a judgement is made on whether $F_{n+1}=1$ or not. Since $F_{n+1}=0$ is judged in the step ②, the step ③ is then selected, in which the data $A_{n+1}$ applied to the input terminal IN is written at the relative address $\alpha$ in the RAM 15. Next, in the step ④, it is judged whether $F_n=0$ or $F_{n+1}=1$. Since $F_n=0$ is judged in this step, the step ⑤ is then selected, in which the data $\beta_{dt}$ at the relative address $\beta$ in the RAM 15 is read out. Then, the adder 16 executes the following:

$$(\beta_{dt}+\beta_{dt})/2=\beta_{dt}$$

The result of this addition is employed as the input data to be fed into the M-bit latch 17 and is delivered as the output data $B_{n+1}$ from the M-bit latch 17 in synchronism with W. CLOCK at the subsequent point of time (n+1). At this time, since $F_n=0$, the data $\beta_{dt}$ is nothing but the data $A_n$ written into the RAM 15 at the previous point of time (n−1). Therefore, as shown in Table 1, the output data $B_n+1$ is the data $A_n$. Next, in the step ⑦, it is judged whether or not $F_{n+1}=1$. Since $F_{n+1}=0$ is judged in this step, the step ⑧ is then selected, in which the address pointer is changed over. Thus, the data $A_{n+1}$ written at the relative address $\alpha$ in the step ③ is stored at the relative address $\beta$. This is equivalent to the fact that the correct data, which is closest to the present point of time, is stored at the relative address $\beta$.

On the other hand, in the state $1_2$, $F_n=0$ and $F_{n+1}=1$, i.e., this is a case where error data $A_{n+1}$ is generated subsequently to correct data $A_n$. First of all, after an output data $B_n$ is delivered in the step ①, $F_{n+1}=1$ is judged in the step ②. Therefore, the data $A_{n+1}$ is not written at the relative address $\alpha$ in the RAM 15, and the judgement in the subsequent step ④ is selected. In consequence, the contents $\beta_{dt}$ at the relative address $\beta$, i.e., the data $A_n$, is applied to the input of the M-bit latch 17 so as to be delivered in synchronism with the subsequent W. CLOCK similarly to the case of the state $1_1$. Moreover, since $F_{n+1}=1$ is judged in the step ⑦, the address pointer is not changed over, and the data $A_n$ is stored at the relative address $\beta$.

Next, in the state 2, $F_n=1$ and $F_{n+1}=0$, i.e., this is a case where a correct data word $A_{n+1}$ is obtained subsequently to an error data word $A_n$. First of all, in the step ①, the correct data $A_j$, which is closest to the present point of time is delivered as an output data $B_n$ is synchronism with W. CLOCK. Since $F_{n+1}=0$ is judged in the step ②, the data $A_{n+1}$ is written at the relative address $\alpha$ in the step ③. After the judgement in the step ④, the step ⑥ is selected, in which the arithmetic operation, $(\alpha_{dt}+\beta_{dt})/2$ is executed. The result of the operation is applied to the input of the M-bit latch 17 so as to be delivered as the output data $B_{n+1}$. Moreover, after $F_{n+1}$ is judged in the step ⑦, the address pointer is changed over. Thus, similarly to the case of the state $1_1$, the data $A_{n+1}$ written at the relative address in the step ③ is stored at the relative address $\beta$ as the correct data which is closest to the present point of time.

In the state 3, $F_n=1$ and $F_{n+1}=1$, i.e., this is a case where two error data words are consecutively generated. In a manner similar to the above, after the data $A_j$ is delivered as an output data $B_n$ in the step ①, $F_{n+1}=1$ is judged in the step ②. In consequence, the data $A_{n+1}$ is not written at the relative address $\alpha$, and the judgement in the step ④ is selected. Further, the step ⑤ is selected, in which the arithmetic operation in the step ⑤ is performed. Thus, since $\beta_{dt}$ is the data $A_j$, this data is delivered as an output data $B_{n+1}$ from the M-bit latch 17 in synchronism with the subsequent W. CLOCK. Moreover, because of the judgement made in the step ⑦ the address pointer is not changed over; therefore, the data $A_j$ is still stored at the relative address $\beta$ as the data words which is correct and closest in time to the present point of time.

Thus, according to the algorithm in accordance with the invention shown in FIG. 3, it is possible to obtain the output data $B_{n+1}$ in each of the states as shown in Table 1.

Figure 4:
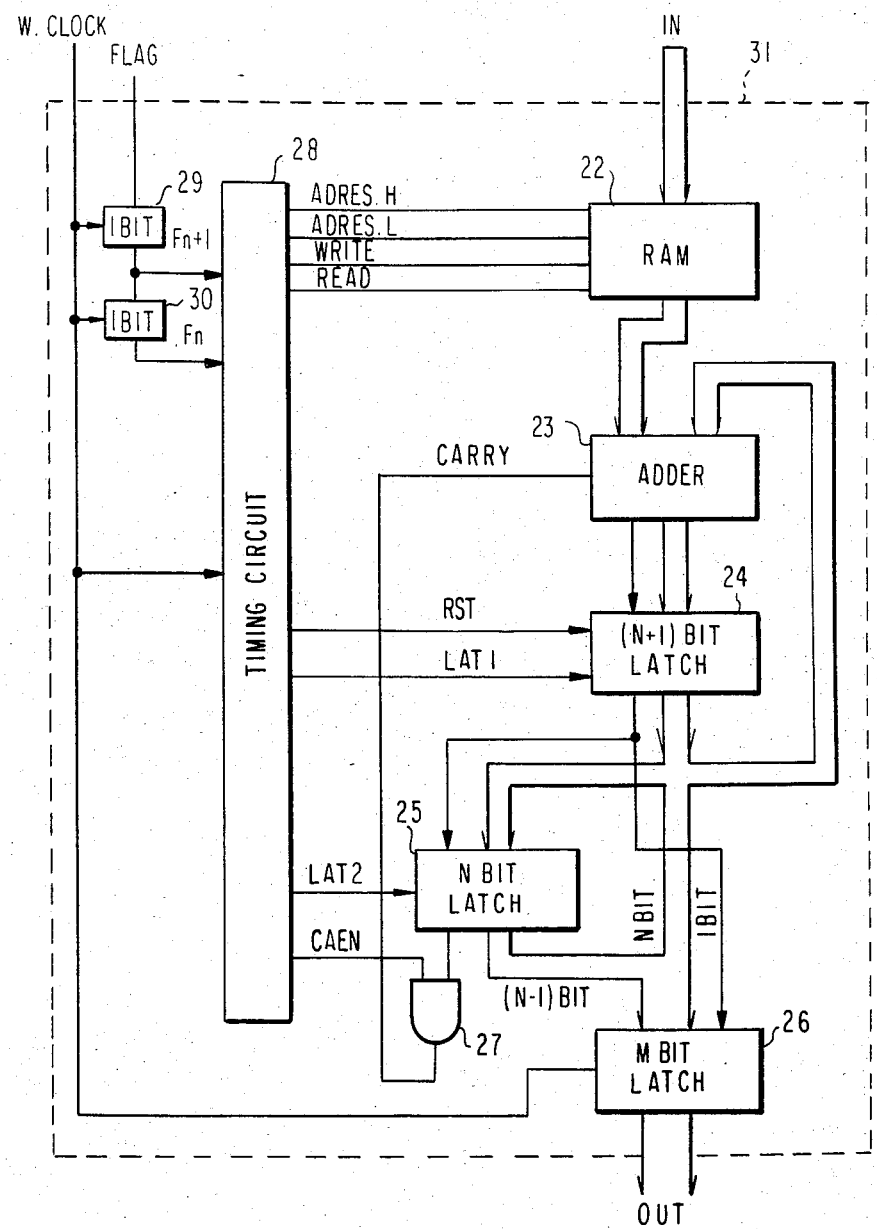
FIG. 4 is a detailed block diagram of the data interpolating circuit in accordance with the embodiment of the invention.
Figure 5:
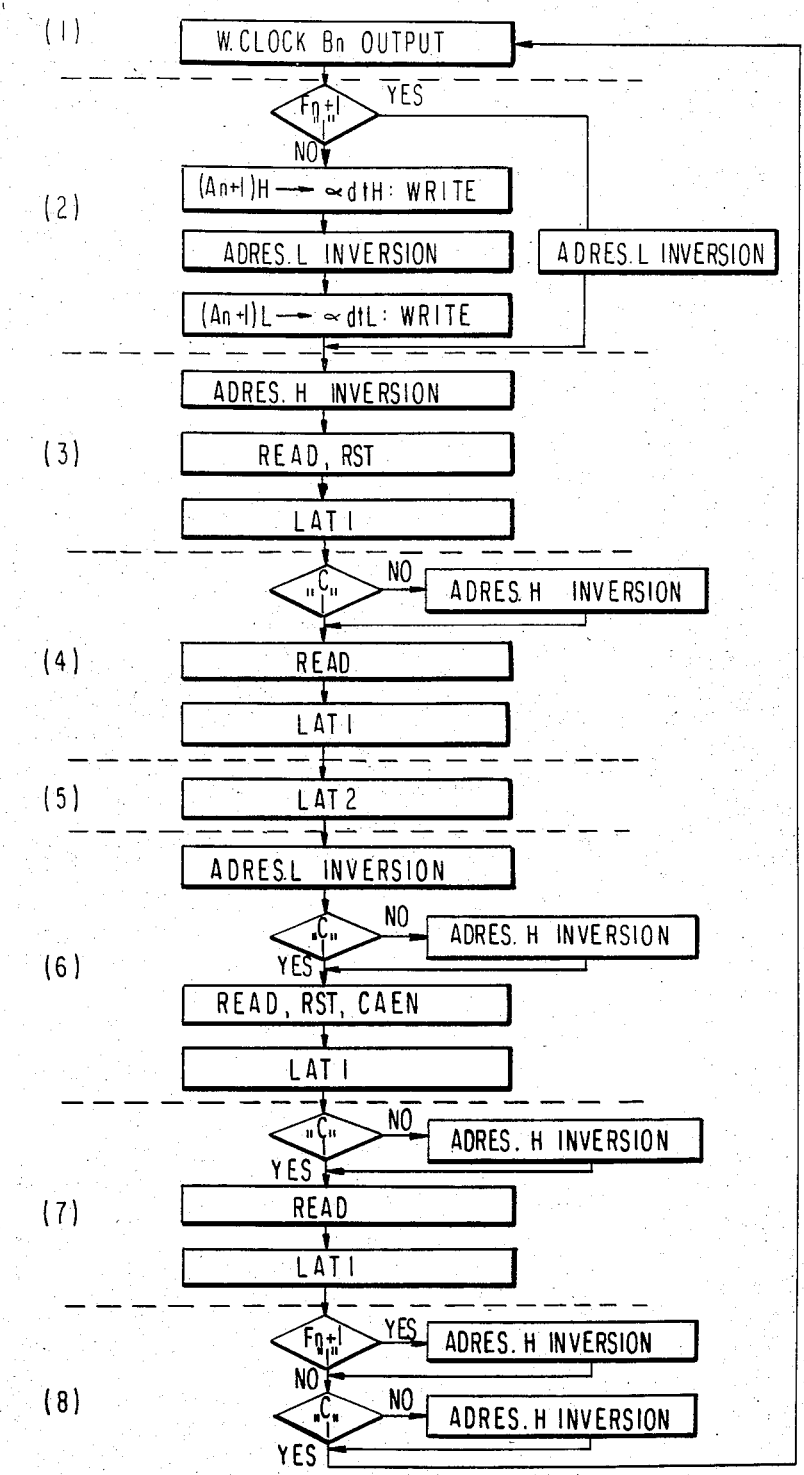
FIG. 5 is a detailed flowchart of the operation of the circuit of FIG. 4.

FIGS. 4 and 5 are a block diagram and an operation flowchart of a circuit constructed and operating in accordance with the embodiment of the invention previously described with reference to FIGS. 2 and 3.

In FIG. 4, the data interpolating circuit in accordance with the embodiment comprises a RAM 22 with a memory capacity of N bits x four symbols (two symbols means one word (M bits), and a symbol means upper or lower portion of a word), an adder 23 which performs an addition of an N-bit symbol (one symbol) and an N-bit symbol, an (N+1)-bit latch 24 for latching N bits as the result of the addition performed by the adder 23 and a carry CO of one bit, an N-bit latch 25 for latching N−1 bits, except for the LSB, of the output of the (N+1)-bit latch 24 and a carry CO of the low-order addition, a gate 27 inserted between a one-bit carry output terminal in the output of the N-bit latch 25 and a carry input terminal of the adder 23, an M-bit latch 26 for latching an upper portion addition result from the (N+1)-bit latch 24 and the (N−1) bits from the N-bit latch 25.

Firstly, the adder 23, produces the result of a low-order addition. The result has a one bit carry for the upper portion and the added N bits data. However, since a mean value is required, the LSB of the added N bits data is omitted and the remainder (N−1) bits are latched to the N bit latch 25 with the carry. That is, the latch 25 is used to temporarily store the result of the mean value of the low-order calculation.

Secondly, the adder 23 produces the result of a high-order addition. This result has a carry bit and the added value (N bits) of the high-order data. Therefore, (N+1) bits are latched to the latch 24 as the result of the high-order calculation. Though the added value must be divided by 2 in order to get a mean value, this operation is executed by positioning the added value at an upper portion of the M bit latch 26, and by positioning the carry bit of the high-order addition at the MSB of the M bit latch 26. As the result, a data obtained by adding M bits with M bits is shifted to rightward by one bit and is stored to the latch 26. It is well known that the shift operation of one bit to rightward is equal to a division by 2.

The circuit of FIG. 4 further includes one-bit latches 29 and 30 for latching an error flag bit, respectively, and a timing circuit 28 for controlling the timing of each of these elements.

In this case, it is assumed that one word is constituted by two symbols. Signals ADRES.H, ADRES.L, WRITE and READ on their respective signal lines in FIG. 4 are high-order and low-order bits on two address lines for accessing four symbols in the RAM 22, a write signal and a read signal, respectively. Reference symbols RST and LAT 1 denote a reset signal, respectively, and a latch signal for the (N+1)-bit latch 24. A reference symbol LAT 2 represents a latch signal for the N-bit latch 25, while a symbol CAEN denotes a signal for opening the gate 27 for applying the bit in the output of the N-bit latch 25, which corresponds to the carry output, to the carry input end of the adder 23. In addition, W. CLOCK serves as a latch signal for each of the one-bit latches 29, 30 and the M-bit latch 26 and also as a trigger pulse for the timing circuit 28. Moreover, this circuit differs from the circuit schematically shown in FIG. 2 in that an M-bit data is divided into high-order N bits and low-order N bits. The symbols of the high-order N bits in the data at the relative addresses α and β will be represented by symbols $\alpha_{dtH}$, $\beta_{dtH}$, respectively, while the symbols of the low-order N bits will be denoted by $\alpha_{dtL}$, $\beta_{dtL}$, respectively, hereinafter. In this case, the inversion of ADRES.H is equivalent to the replacement between the relative addresses α and β, while the inversion of ADRES.L is equivalent to the changeover between the high-order N-bit symbol and the low-order N-bit symbol at the same relative address.

Referring now to FIG. 5 which is a flowchart, reference numerals (1), (2), (3) . . . (8) represent steps generated by the timing circuit 28, respectively, while a reference symbol C denotes the logic represented by the logical expression, $C=\overline{F_n}+F_{n+1}$. The logic is true when "$F_n=0$ or $F_{n+1}=1$". The relationship between the flowchart shown in FIG. 5 and the algorithm shown in FIG. 3 is as follows: The step (1) in FIG. 5 corresponds to the step ① in FIG. 3; the step (2) in FIG. 5 to the steps ②, ③ in FIG. 3; the steps (3), (4), (5), (6), (7) in FIG. 5 to the steps ④, ⑤, ⑥ in FIG. 3; and the step (8) in FIG. 5 to the steps ⑦, ⑧ in FIG. 3.

The flowchart shown in FIG. 5 will now be described. In the step (1), an output data $B_n$ at the point of time (n−1) is delivered in synchronism with W. CLOCK. In the step (2), when $F_{n+1}=0$, i.e., when the data $A_{n+1}$ applied to the input terminal IN is correct, first, the high-order part $(A_{n+1})_H$ of the data $A_{n+1}$ is written in the high-order part of the relative address α in the RAM 22. Then, ADRES.L is inverted to write the low-order part $(A_{n+1})_L$ in the low-order part of the relative address. In this case, if $F_{n+1}=1$, only ADRES.L is inverted to make the address designate the low-order part of the relative address α, and the data $A_{n+1}$ is not written.

Next, in the step (3), first, ADRES.H is inverted to make the address in the RAM 22 designate the low-order part of the relative address β, and this data $\beta_{dtL}$ is read out and employed as one input of the adder 23. At the same time, the reset signal RST is applied to the (N+1)-bit latch 24 to reset the latter, thereby to apply a symbol, constituted by bits all of which are 0, to the other input of the adder 23. Thus, the data $\beta_{dtL}$ can be obtained at the output of the adder 23. At this point of time, the latch signal LAT 1 is applied to the (N+1)-bit latch 24 for latching. As a result, the data $B_{dtL}$ is applied to the other input of the adder 23 at the final point of time in the step (3).

Next, in the step (4), first, when C=1, i.e., when $F_n=0$ or $F_{n+1}=1$, ADRES.H is not inverted, so that the address in the RAM 22 is not changed. In consequence, the symbol read out from the RAM 22 is $\beta_{dtL}$, and $(\beta_{dtL}+\beta_{dtL})$ can be obtained at the output of the adder 23. Further, the application of the latch signal LAT 1 causes both the result N bits and the carry output bit to be stored in the (N+1)-bit latch 24. On the other hand, when C=0 is first judged in the step (4), ADRES.H is inverted, so that $\alpha_{dtL}$ is read out from the RAM 22, and the addition result $(\beta_{dtL}+\alpha_{dtL})$ of the adder 23 is stored in the (N+1)-bit latch 24 as the sum of an N-bit result and a one-bit carry output.

Next, in the step (5), both the high-order (N−1) bits in the N-bit addition result and the carry output one bit stored in the (N+1)-bit latch 24 are stored into the N-bit latch 25 by the application of LAT 2 thereto.

In the subsequent steps (6), (7), the inversion of ADRES.L causes the high-order part of the data to be read out from the RAM 22. Therefore, a comparison similar to that in the step (4) is made in these steps. In the case where an addition, $(\beta_{dtL}+\beta_{dtL})$, has been executed in the steps (4), (5), an addition $(\beta_{dtH}+\alpha_{dtH}+$ CARRY) is performed in the steps (6), (7). In the case where an addition, $(\beta_{dtH}+\alpha_{dtL})$ has been carried out in the steps (4), (5), an addition, $(\beta_{dtH}+\alpha_{dtH}+\text{CARRY})$, is performed in the steps (6), (7). In either case, both an N-bit addition result and a one-bit carry output are stored into the (N+1)-bit latch 24 by the application of LAT 1 thereto. More specifically, at the final point of time in the step (7), both the (N+1)-bit latch 24 and the N-bit latch 25 have stored therein the data obtained by shifting the result of $(\beta_{dt}+\beta_{dt})$ in the LSB direction by one bit, i.e., $(\beta_{dt}+\beta_{dt})/2=\beta_{dt}$, in the case of C=1, and, similarly, $(\beta_{dt}+\alpha_{dt})/2$ in the case of C=0. In addition, at this time, the address in the RAM 22 designates the relative address $\beta_H$ when C=1, and the relative address $\alpha_H$ when C=0.

Further, in the step (8), in the case of the abovementioned state $1_1$, i.e., if $F_n=0$ and $F_{n+1}=0$, then C=1. Therefore, the inversion of ADRES.H is not carried out. In consequence, the address maintains the state where it designates the relative address $\beta_H$, and this address is regarded as the relative address $\alpha_H$ in the processing of (n+1) which is initiated from the subsequent W.CLOCK. In other words, the address pointer has been changed over. On the other hand, in the case of the state $1_2$, i.e., when $F_n=0$, $F_{n+1}=1$ and C=1, ADRES.H is inverted only once, so that the address is changed to the relative address $\alpha_H$. Accordingly, in the processing for (n+1) which is intiated from the subsequent W.CLOCK, this address is regarded as the relative address $\alpha_H$ as it is; therefore, the changeover of the address pointer is not carried out. In the case of the state 2 in Table 1, i.e., when $F_n=1$, $F_{n+1}=0$ and C=0, ADRES,H is inverted only once. In consequence, the address designates the relative address $\beta_H$, so that the changeover of the address pointer is effected. Further, in the case of the state 3 in Table 1, i.e., when $F_n=1$, $F_{n+1}=0$ and C=1, ADRES.H is inverted only once, so that the address is changed to the relative address $\alpha_H$. Therefore, the address pointer is not changed over. Table 2 below shows: whether the writing of the data $A_{n+1}$ is done or not in each of the states 1, 2, 3 at the final point of time in the step (8) after a series of steps have been thus passed; the contents of the (N+1)-bit latch 24 and the N-bit latch 25; the designated address in the RAM 22; and whether the changeover of the address pointer is done or not.

TABLE 2

| State | $1_1$ | $1_2$ | 2 | 3 |
|---|---|---|---|---|
| $F_n$ | 0 | 0 | 1 | 1 |
| $F_{n+1}$ | 0 | 1 | 0 | 1 |
| $C = \overline{F_n + F_{n+1}}$ | 1 | 1 | 0 | 1 |
| Writing of $A_{n+1}$ | done | not done | done | not done |
| Contents of (N + 1)-bit latch & (N − 1)-bit latch | $\beta_{dt}$ | $\beta_{dt}$ | $\frac{\beta_{dt} + \alpha_{dt}}{2}$ | $\beta_{dt}$ |
| Address | $\beta_H$ | $\alpha_H$ | $\beta_H$ | $\alpha_H$ |
| Changeover of address pointer | done | not done | done | not done |

Thus, the flowchart shown in FIG. 5 obviously makes transition according to the algorithm shown in FIG. 4. Therefore, in the circuit in accordance with the embodiment shown in FIG. 4, the application of the subsequent W.CLOCK allows the desired data to be delivered as an output data $B_{n+1}$.

(EFFECTS OF THE INVENTION)

As described above, the circuit in accordance with the invention performs the desired operations shown in Table 1 due to the novel memory access architecture. The following is the remarkable effects offered by the circuit:

I. Since the high-order part and low-order part of data are separately processed in a time-division manner, the number of data bit lines required for the circuit is reduced to a half of that for the prior art circuit.

II. The delivery of a mean value interpolation output and the selection of data in the cases other than the delivery are effected by changing the symbols to be applied to the adder simply by the change of the addresses in the RAM, and executing an arithmetic operation, $(\alpha_{dt}+\beta_{dt})/2$ or $(\beta_{dt}+\beta_{dt})/2$ in a single adder. Therefore, the processing step number sequence is the same in any state, so that the timing circuit, which generates timing pulses, can be constituted by a simple circuit which generates a single pulse train by the trigger of W.CLOCK.

III. The number of required elements can be greatly reduced, since it is possible to omit the multiplexer for data selection.

Moreover, when data in a plurality of channels are processed as in the case of an audio signal, if the number of channels is represented by m, the prior art circuit requires a circuit size m times as large as that in the case of one channel. According to the invention, however, the adder, the (N+1)-bit latch and the (N−1)-bit latch used for a plurality of channels are the same as those in the case of one channel, and the circuit of the invention can be easily adapted for a multiplicity of channels by increasing the number of latches for storing error flags m times as many as and the data capacity of the RAM m times as much as those in the case of one channel, and processing the data in a time-division multiplex manner for each channel. In this case, to increase the capacity of the RAM on an integrated circuit, it is only necessary to add the repetition of cells of the RAM; hence, it is, as a matter of course, possible to realize a circuit with an extremely reduced area as compared with an m-fold increase in circuit size.

As has been described, according to the invention, it is possible to provide a data interpolating circuit which performs a complete data interpolation processing and is best suitable for the formation by means of an integrated circuit, with an extremely simple circuit configuration. Thus, the invention offers a considerable amount of practical profit.

What is claimed is:

1. A data interpolating circuit under control of a source of clock signals for interpolating an erroneous data word which is contained in a plurality of digital data words in a received digital bit stream, each data word being constituted by a plurality of bits and being accompanied by an error-flag bit, said circuit comprising:

an error-flag latch means connected to remove said error flag bits and said clock signals for temporarily storing both an error-flag bit added to an n-th data word and an error-flag bit added to an (n+1)th data word, where n stands for an integer of two or more;

a memory circuit connected to receive said digital bit stream and consisting of first and second memory regions for storing two data words;

a timing circuit means connected to receive said clock signals and signals stored in said error flag latch means and to provide control signals to said memory circuit for controlling the operation of writing an input data word into said first memory region and of transferring a data word stored in said first memory region to said second memory region in accordance with the data stored in said error-flag latch means whereby, at a given point in time, a correct data word is stored in said first memory region and the last occurring correct data is stored in said second memory region;

an arithmetic circuit connected to said memory circuit and said timing circuit means for performing an arithmetic operation on the data words read out from said memory circuit in accordance with the data stored in said error-flag latch means and an output of said timing circuit means; and an output latch means connected to said arithmetic circuit for temporarily storing the result of the arithmetic operation and providing the result as an output under control of said clock signals.

2. A data interpolating circuit as claimed in claim 1, wherein each said memory region is divided into first and second parts for storing lower and upper halves of said data words in order to permit all write, read and arithmetic functions of said memory and arithmetic means to be carried out in the sequence of one-half of a data word followed by the other half of the data word.

3. A data interpolating circuit as claimed in claim 1, in which said error flag latch, said memory circuit, said timing circuit, said arithmetic circuit and said output latch are integrated on a single semiconductor chip.

4. A data interpolating circuit as claimed in claim 3, wherein each said memory region is divided into first and second parts for storing lower and upper halves of said data words in order to permit all write, read and arithmetic functions of said memory and arithmetic means to be carried out in the sequence of one-half of a data word followed by the other half of the data word.

5. A data interpolating circuit as claimed in claim 1, wherein said output latch includes a first means for temporarily storing a first result of said arithmetic operation, a second means for temporarily storing a second result of said arithmetic operation, and a third means for storing both the contents of said first means and said second means as interpolated data.

6. A data interpolating circuit as claimed in claim 5, wherein each said memory region is divided into first and second parts for storing lower and upper halves of said data words, in order to permit all write, read and arithmetic functions of said memory and arithmetic means to be carried out in the sequence of one-half of a data word followed by the other half of the data word.

7. A data interpolating circuit as claimed in claim 5, wherein an output of said second means as applied to said first means, said third means and said arithmetic circuit.

8. A data interpolating circuit as claimed in claim 7, wherein each said memory region is divided into first and second parts for storing lower and upper halves of said data words in order to permit all write, read and arithmetic functions of said memory and arithmetic means to be carried out in the sequence of one-half of a data word followed by the other half of the data word.

9. A data interpolating circuit as claimed in claim 1 wherein said error-flag latch comprises a one bit n-latch and a one bit n+1 latch for storing the error-flag bits of the nth and (n+1)th data words, respectively.

10. A data interpolating circuit as claimed in claim 9, wherein each said memory region is divided into first and second parts for storing lower and upper halves of said data words in order to permit all write, read and arithmetic functions of said memory and arithmetic means to be carried out in the sequence of one-half of a data word followed by the other half of the data word.

11. A data interpolating circuit as claimed in claim 9, wherein said timing circuit means performs the following control functions responsive to the data stored in said error-flag latch means:

(a) writing said (n+1)th data word in said first memory regions only if the error-flag bit of said (n+1)th word indicates no error;

(b) reading out and applying to said arithmetic circuit either the data words stored in both said memory regions or only the data word stored in said second memory region, dependent upon the data stored in said error-flag latch means; both data words being read out and applied only where the error-flag bit for the nth word indicates error and the error-flag bit for the (n+1)th word indicates no error; and (c) switching the addresses of said first and second memory regions, in response to said error flag bit of said (n+1)th word indicating no error, so that said first memory region becomes said second memory region and vice versa in the next sequence of read and write functions.

12. A data interpolating circuit as claimed in claim 11, wherein each said memory region is divided into first and second parts for storing lower and upper halves of said data words in order to permit all write, read and arithmetic functions of said memory and arithmetic means to be carried out in the sequence of one-half of a data word followed by the other half of the data word.

13. A data interpolating circuit as claimed in claim 11, wherein said arithmetic circuit includes an adder and shifting means for providing at an output thereof (a) the data word stored in said second memory region of said memory circuit when only that data word is read out of the memory circuit, and (b) the mean value of the two data words in said memory circuit, when both said data words are read out of said memory circuit.

14. A data interpolating circuit as claimed in claim 13, wherein each said memory region is divided into first and second parts for storing lower and upper halves of said data words in order to permit all write, read and arithmetic functions of said memory and arithmetic means to be carried out in the sequence of one-half of a data word followed by the other half of the data word.

15. A data interpolating circuit as claimed in claim 1, wherein said arithmetic circuit performs the following operations:

the n th data word is outputted when the flag of the n-th data word indicates that the word is correct;

a data word representing $(A_j + A_{n+1})/2$ is outputted when the flags of the prior data word $(A_n)$ and current data word $(A_{n+1})$ indicate error and correct, respectively, (where $A_j$ represents a last occurring correct data); and the data word $(A_j)$ is outputted when the flags of the data words $A_n$ and $A_{n+1}$ indicate error.

16. A data interpolating circuit comprising:

an input means for sequentially receiving at least two input data words;

a memory means coupled to said input means for storing two input data words;

a first means for storing a first error bit for designating whether one of said two input data words is correct or not;

a second means for storing a second error bit for designating whether the other of said two input data words is correct or not;

means responsive to said first and second error bits for storing the corresponding data words in said memory only if the respective error bit indicates no error;

an access means for selectively reading out one or both of the data words stored in said memory means according to said first and said second error bits;

an arithmetic means coupled to said memory means;

a third means for storing an output of said arithmetic means;

a fourth means coupled to said third means and said arithmetic means for feeding back said output to said arithmetic means;

a fifth means coupled to an output end of said third means for storing an output of said third means; and a sixth means coupled to output ends of said third means and said fifth means for storing both contents of said third means and said fifth means as interpolated data.

17. A data interpolating circuit comprising:

an input means for sequentially receiving at least two input data words;

a memory means coupled to said input means for storing two input data words;

a first means for storing a first error bit for designating whether one of said two input data words is correct or not;

a second means for storing a second error bit for designating whether the other of said two input data words is correct or not;

means responsive to said first and second error bits for storing the corresponding data words in said memory only if the respective error bit indicates no error;

an access means for selectively reading out one or both of the data words stored in said memory means according to said first and said second error bits;

an arithmetic means coupled to said memory means for performing an arithmetic operation on the data words read out from said memory means; and a third means for storing an output of said arithmetic means.

* * * * *

UNITED STATES PATENT AND TRADEMARK OFFICE
CERTIFICATE OF CORRECTION

PATENT NO. : 4,639,920

DATED : January 27, 1987

INVENTOR(S) : Takashi KANEKO

It is certified that error appears in the above-identified patent and that said Letters Patent is hereby corrected as shown below:

Column 10, Line 60, Claim 1 Delete "remove" and insert --receive--.

Signed and Sealed this

Fifteenth Day of September, 1987

Attest:

DONALD J. QUIGG

*Attesting Officer*   *Commissioner of Patents and Trademarks*